United States Patent
Ebeling et al.

(10) Patent No.: US 11,580,172 B2
(45) Date of Patent: *Feb. 14, 2023

(54) CONTACT CREATION AND UTILIZATION

(71) Applicant: Microsoft Technology Licensing, LLC, Redmond, WA (US)

(72) Inventors: Rolf Ebeling, Kirkland, WA (US); Alan Urdan, Seattle, WA (US); Annice Jumani, Mercer Island, WA (US); YuBeen Lee, Bellevue, WA (US); Shikha Desai, Bellevue, WA (US); Paul Scudieri, Seattle, WA (US); Stephanie Cooper, Seattle, WA (US); Taili Feng, Bellevue, WA (US); Yu Mao, Seattle, WA (US); Allison Whilden, Kirkland, WA (US); Ruth Kikin-Gil, Redmond, WA (US); Alicia Drummond, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/227,991

(22) Filed: Apr. 12, 2021

(65) Prior Publication Data
US 2021/0232640 A1    Jul. 29, 2021

Related U.S. Application Data

(63) Continuation of application No. 16/660,239, filed on Oct. 22, 2019, now Pat. No. 10,997,253, which is a
(Continued)

(51) Int. Cl.
*G06F 17/00* (2019.01)
*G06F 16/93* (2019.01)
(Continued)

(52) U.S. Cl.
CPC ............ *G06F 16/93* (2019.01); *G06F 40/106* (2020.01); *G06F 40/166* (2020.01); *G06F 40/205* (2020.01); *G06Q 10/101* (2013.01)

(58) Field of Classification Search
None
See application file for complete search history.

(56) References Cited

U.S. PATENT DOCUMENTS

| 2012/0278401 A1* | 11/2012 | Meisels | ................. H04L 51/234 709/206 |
| 2016/0294739 A1* | 10/2016 | Stoehr | .................... G06Q 30/01 |

FOREIGN PATENT DOCUMENTS

CN    1790401 B    7/2012

OTHER PUBLICATIONS

"First Office Action and Search Report Issued in Chinese Patent Application No. 201780017495.0", dated Jul. 12, 2021, 19 Pages.
(Continued)

*Primary Examiner* — Mustafa A Amin
(74) *Attorney, Agent, or Firm* — NovoTechIP International PLLC

(57) ABSTRACT

Non-limiting examples of the present disclosure describe creation and management of a contact associated with a document. A contact for a document in a first application may be created. The contact may be used to add content, from a second application, to the document. The contact may be stored. Contact data for the contact may be transmitted to one or more processing devices. An exemplary created contact may be used to transfer content from one or more applications to a document of another application. Other examples are also described.

20 Claims, 13 Drawing Sheets

Related U.S. Application Data continuation of application No. 15/072,156, filed on Mar. 16, 2016, now Pat. No. 10,482,132.

(51) Int. Cl.
*G06Q 10/101* (2023.01)
*G06F 40/106* (2020.01)
*G06F 40/166* (2020.01)
*G06F 40/205* (2020.01)

(56) References Cited

OTHER PUBLICATIONS

"Summons to Attend Oral Proceedings Issued in European Patent Application No. 17714972.1", dated Mar. 11, 2022, 10 Pages.
"Second Office Action and Search Report Issued in Chinese Patent Application No. 201780017495.0", dated Nov. 24, 2021, 18 Pages.

* cited by examiner

Aurora Document
Done — Back to Files

Cause of Auroras

A full understanding of the physical processes which lead to different types of auroras is still incomplete, but the basic cause involves the interaction of the solar wind with the Earth's magnetosphere. The varying intensity of the solar wind produces effects of different magnitudes, but includes one or more of the following physical scenarios.

Conversation Between You and Kat

Kat: We should add the information from class we had on Thursday. Professor Smith talked about the different variants we should take into account when evaluating Auroras.

Added By Kat 3 hours ago via SMS

Aurora Information

1. A quiescent solar wind flowing past the Earth's magnetosphere steadily interacts with it and can both inject solar wind particles directly onto the geomagnetic field lines that are 'open', as opposed to being 'closed' in the opposite hemisphere, and provide diffusion through the bow shock.

CONTACT CREATION AND UTILIZATION

CROSS-REFERENCE TO RELATED APPLICATIONS

This application is a continuation application of U.S. patent application Ser. No. 16/660,239, now U.S. Pat. No. 10,997,253, filed Oct. 22, 2019, which application is a continuation of U.S. patent application Ser. No. 15/072,156, now U.S. Pat. No. 10,482,132, filed on Mar. 16, 2016, the entire disclosures of which are hereby incorporated herein by reference.

BACKGROUND

User research is showing communication in collaborative projects frequently occurs in applications that are beyond a single document. Collaboration for projects may span multiple applications and include content in different formats. If collaboration occurs outside of an application for a document, the document is empty and unaware of communications that are external to the document. In that case, when a user sits down to work on a document, the user has to recall in which application the communication occurred. Further, the user has to perform additional steps to transfer the content from one application to a document in a different application. In such cases, much of the context of the communication may be lost. It is with respect to the general technical environment of improved processing for devices that transfer data between applications that the present application is directed.

SUMMARY

Non-limiting examples of the present disclosure describe creation and management of a contact associated with a document. A contact for a document in a first application may be created. The contact may be used to add content, from a second application, to the document. The contact may be stored. Contact data for the contact may be transmitted to one or more processing devices. An exemplary created contact may be used to transfer content from one or more applications to a document of another application.

In other non-limiting examples of the present disclosure, a contact created for one or more documents may be used to transfer content from at least a first application to a document in a second application. A communication corresponding with a contact may be received. The communication comprises contact data for the contact and content propagated from a first application. A document may be identified that corresponds with the contact. The document may be associated with a second application. In examples, the communication may be parsed to determine one or more portions of the content to include in the document. The document may be modified to include the one or more portions of content within the document.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 10A and 10B are exemplary processing device views illustrating modification of a document that corresponds to an exemplary contact with which aspects of the present disclosure may be practiced.

DETAILED DESCRIPTION

Figure 1:
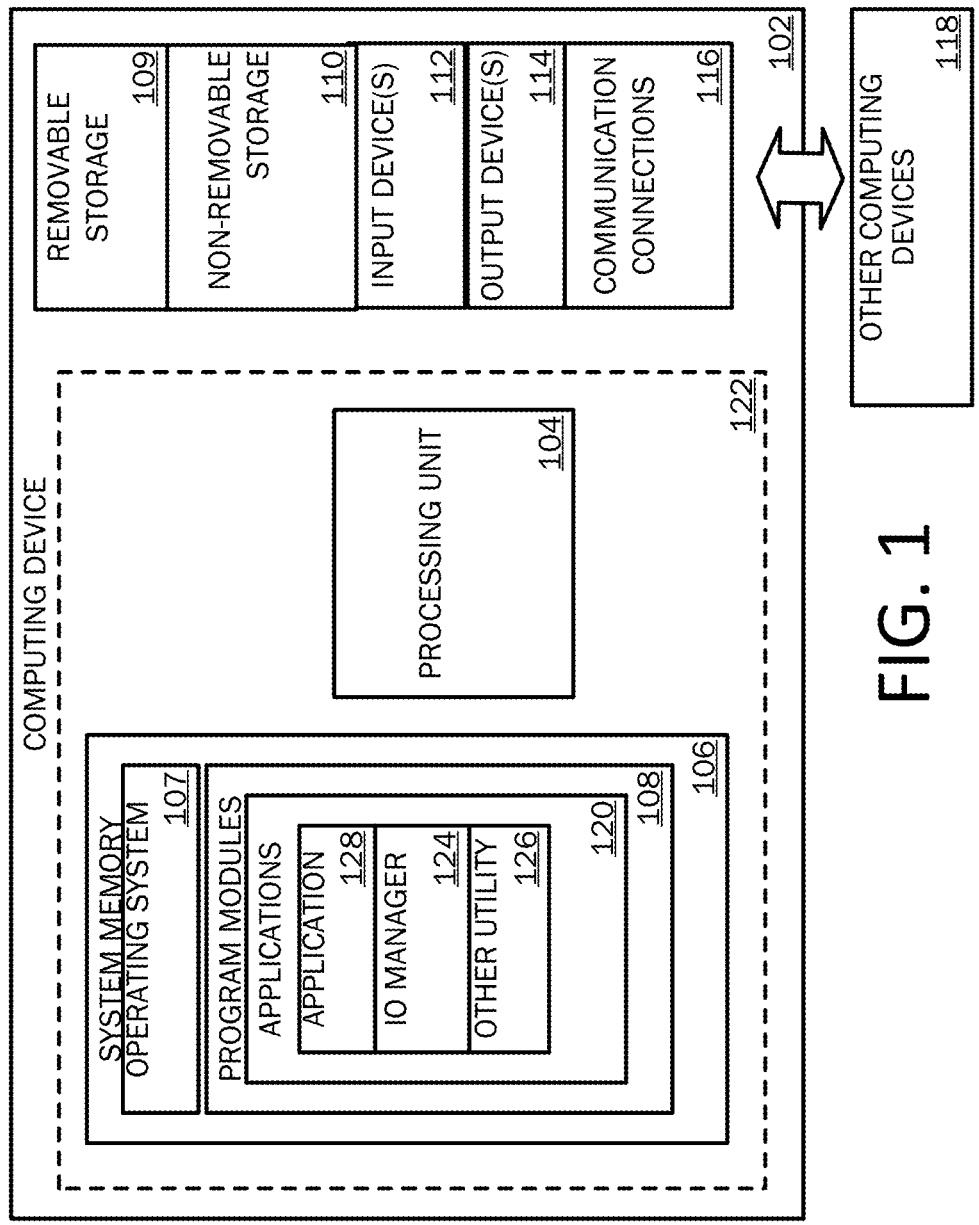
FIG. 1 is a block diagram illustrating an example of a computing device with which aspects of the present disclosure may be practiced.

Examples described herein provide for creation and management of a contact that may be used to identify one or more documents. An exemplary contact as described herein may comprise identity data that can be added to a communication in any of a plurality of different applications. Programming operations described herein may be executed to associate an exemplary contact with one or more documents or files. An exemplary contact may comprise contact data including any of but not limited to: a contact identifier/name, phone number, an email address, informational association with applications/services, sharing properties, and associated documents, among other examples. However, one skilled in the art should recognize that contact data may vary and be scalable to include any data that is usable for communication with one or more other processing devices. Furthermore, in examples, form and field values for contact data may be modifiable.

In examples, a document may be stored in an application that is different from an application in which the communication occurred. As an example, the contact may be used in a communication occurring in a first application, where the contact may be used to capture content and transfer the captured content to a document in another application. In examples, application content can be retrieved from any data including but not limited to websites, documents, storage files, message threads, chat conversations, etc. For instance, consider a communication application such as a messaging application (e.g., short message service (SMS), an email application, a social networking application, a voice/video call application, collaborative workspace applications, etc., where users may collaboratively communicate with each other. Multiple users may be collaborating for a school or work project, event planning etc., while exchanging multiple communication and/or portions of content. Users may be communicating in a first application (e.g., communication application) but managing the collaboration in a separate document executing in a different application (e.g., word document, spreadsheet document, information gathering document, etc.). A contact for a document in a first application may be created that when used, enables content to be transferred from a first application to modify a document in a second application. In some examples, multiple documents may be modified based on contact transferred that corresponds with an exemplary contact. One skilled in the art should recognize that the present disclosure is not limited to application examples described herein. Operations described herein may be applicable to any type of applications where content may be in any data format. In examples, a two-way communication may occur between different applications. For instance, content may be transmitted from the first application to the second application. Updates to the content within a document of the second application may occur and the updates may be transmitted back to a communication occurring in the first application.

Accordingly, the present disclosure provides a plurality of technical advantages including but not limited to: generation and management of an exemplary contact for incorporation of content into a documents/files, extensibility with a plurality of processing devices and applications to enable contact to be captured and transmitted between different applications/devices, improved user interaction during collaboration across different applications, more efficient operation of a processing device executing data transfer across applications (e.g., saving computing cycles/computing resources), and reduction in latency for content transfer between processing devices/applications, among other examples.

Figure 2A:
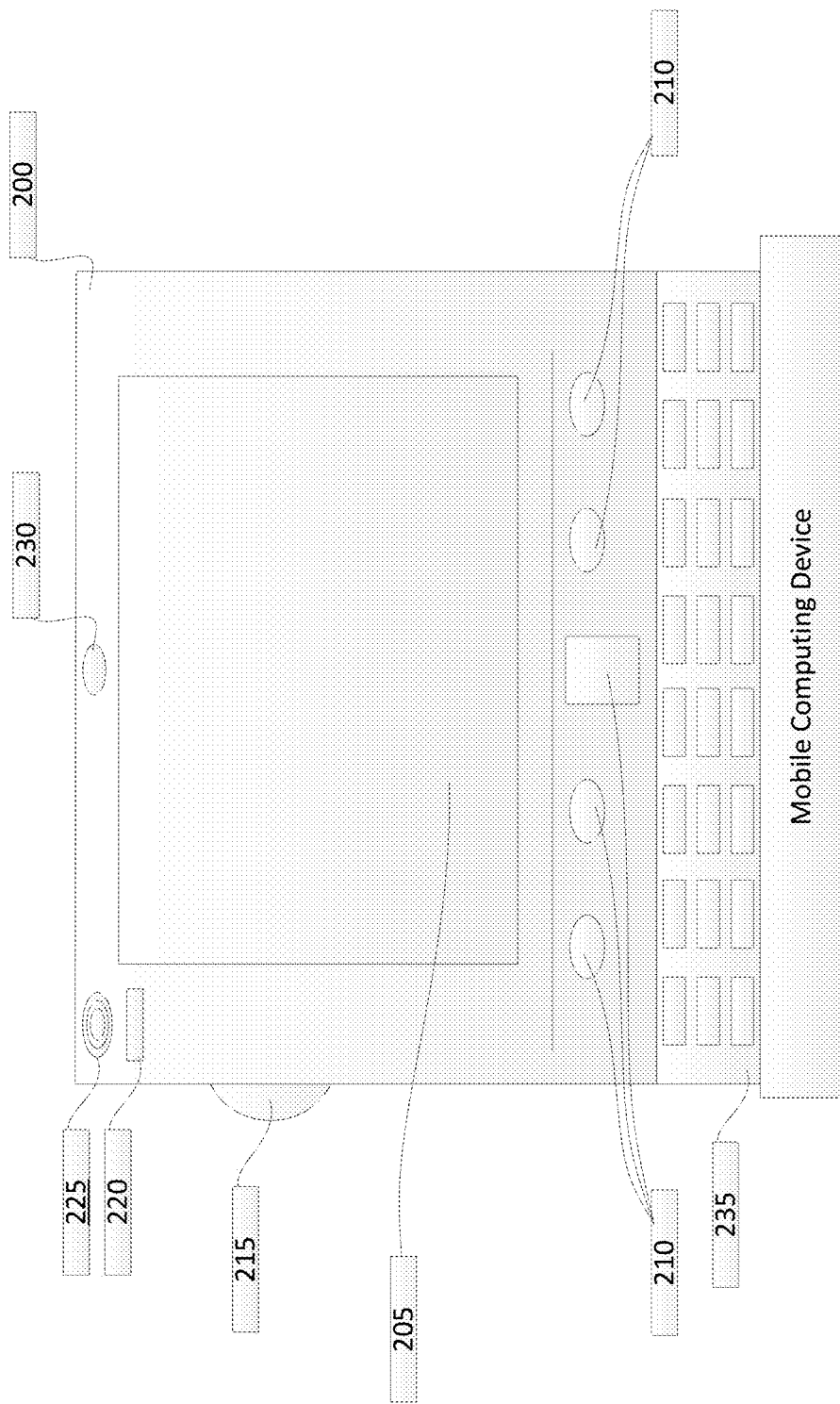
FIGS. 2A and 2B are simplified block diagrams of a mobile computing device with which aspects of the present disclosure may be practiced.
Figure 2B:
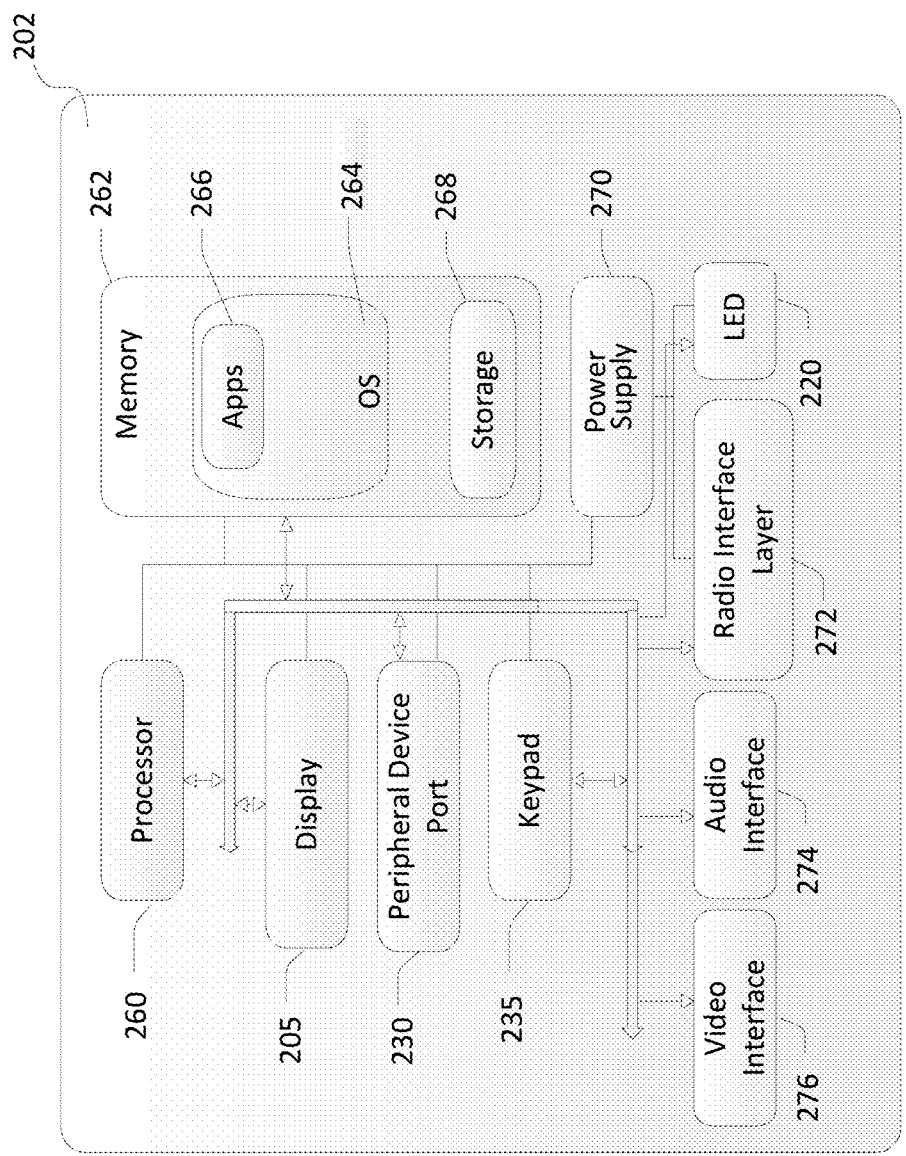
Figure 3:
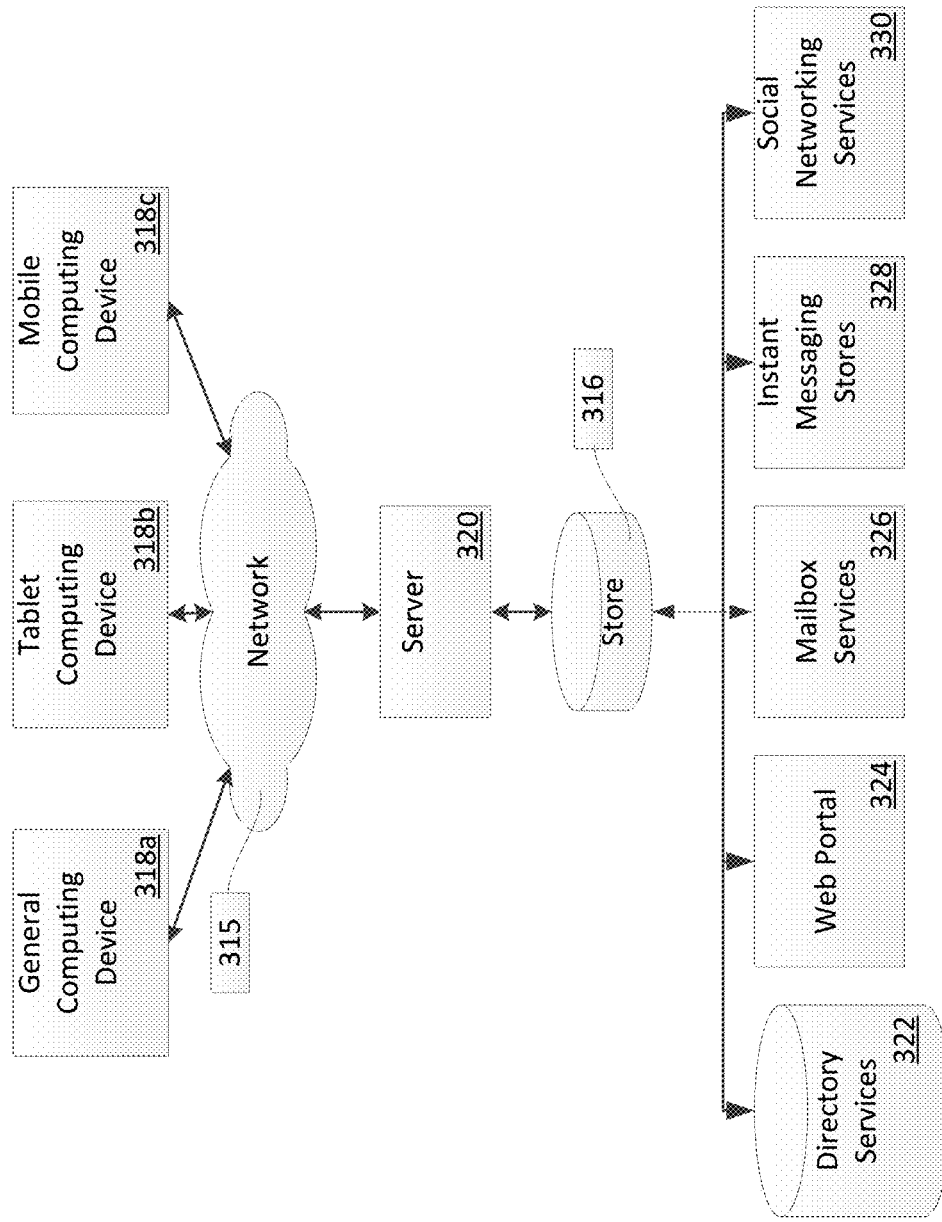
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention, described herein.

FIG. 1 is a block diagram illustrating physical components of a computing device 102, for example a mobile processing device, with which examples of the present disclosure may be practiced. For example, computing device 102 may be an exemplary computing device for implementation of processing performed related to exemplary contact creation and management as described herein. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 102 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 104 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a phablet, a slate, a laptop computer, and the like, with which examples of the invention may be practiced. Mobile computing device 200 may be an exemplary computing device for processing related to exemplary contact creation and management as described herein. For example, mobile computing device 200 may be implemented to execute applications and/or application command control. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., a touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. That is, the mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device 200 described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices. Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225. In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225, the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 illustrates one example of the architecture of a system for providing an application that reliably accesses target data on a storage system and handles communication failures to one or more client devices, as described above. The system of FIG. 3 may be an exemplary system for processing related to exemplary contact creation and management as described herein. Target data accessed, interacted with, or edited in association with programming modules 108, applications 120, and storage/memory may be stored in different communication channels or other storage types. For example, various documents may be stored using a directory service 322, a web portal 324, a mailbox service 326, an instant messaging store 328, or a social networking site 330, application 128, IO manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and client nodes may be implemented as a computing device 102 embodied in a personal computer, a tablet computing device, and/or by a mobile computing device 200 (e.g., mobile processing device). Any of these examples of the client computing device 102 or 200 may obtain content from the store 316.

Figure 4:
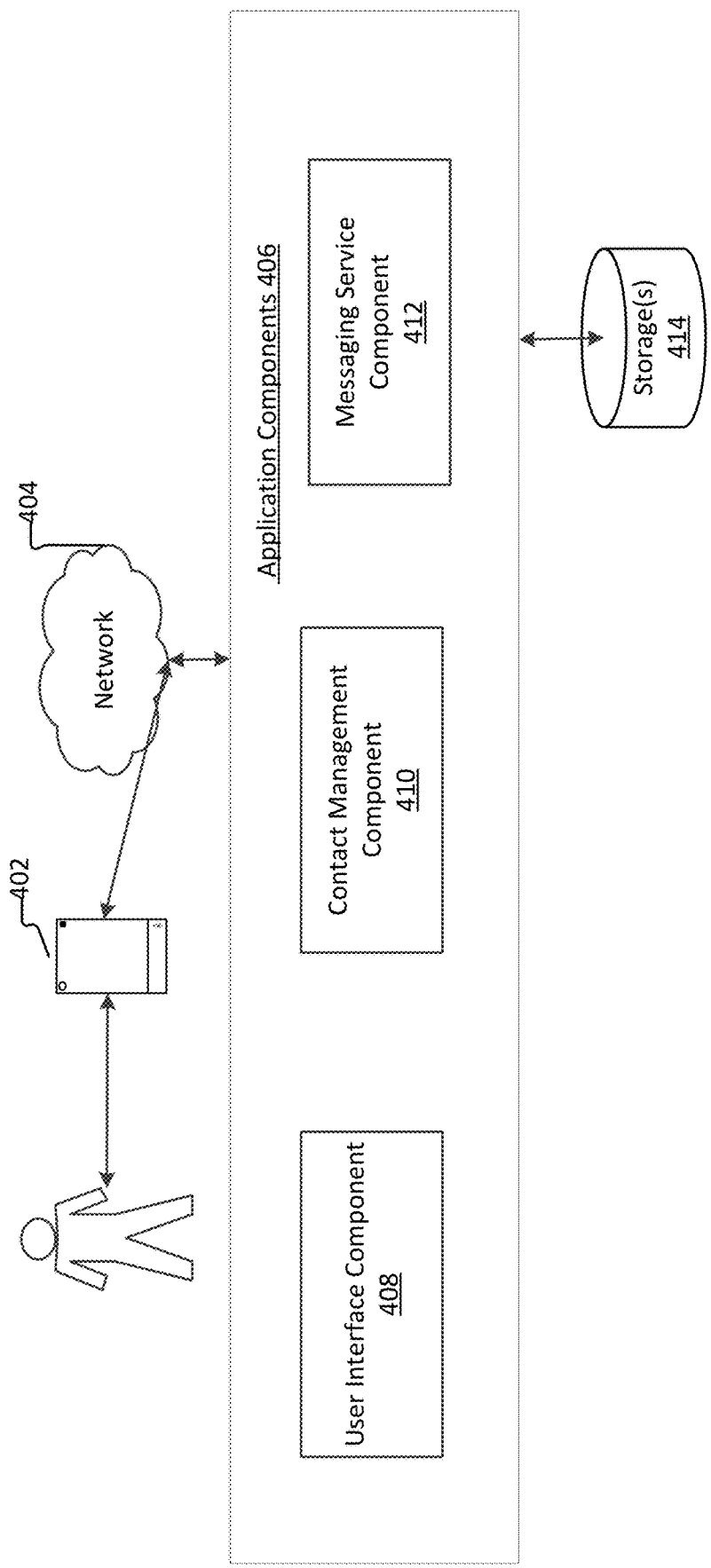
FIG. 4 illustrates an exemplary system implementable on one or more computing devices on which aspects of the present disclosure may be practiced.

FIG. 4 illustrates an exemplary system 400 implementable on one or more computing devices on which aspects of the present disclosure may be practiced. System 400 may be an exemplary system for processing related to exemplary contact creation and management as described herein as described herein. Exemplary system 400 presented is a combination of interdependent components that interact to form an integrated whole for learned program generation based on user example operations. Components of system 400 may be hardware components or software implemented on and/or executed by hardware components. In examples, system 400 may include any of hardware components (e.g., ASIC, other devices used to execute/run an OS, and software components (e.g., applications, application programming interfaces, modules, virtual machines, runtime libraries) running on hardware. In one example, an exemplary system 400 may provide an environment for software components to run, obey constraints set for operating, and makes use of resources or facilities of the systems/processing devices, where components may be software (e.g., application, program, module) running on one or more processing devices. For instance, software (e.g., applications, operational instructions, modules) may be run on a processing device such as a computer, mobile device (e.g., smartphone/phone, tablet) and/or any other electronic devices. As an example of a processing device operating environment, refer to operating environments of FIGS. 1-3. In other examples, the components of systems disclosed herein may be spread across multiple devices. For instance, input may be entered on a client device (e.g., processing device) and information may be processed or accessed from other devices in a network such as one or more server devices.

One of skill in the art will appreciate that the scale of systems such as system 400 may vary and may include more or fewer components than those described in FIG. 4. In some examples, interfacing between components of the system 400 may occur remotely, for example where components of system 400 may be spread across one or more devices of a distributed network. In examples, one or more data stores/storages or other memory are associated with system 400. For example, a component of system 400 may have one or more data storages/memories/stores associated therewith. Data associated with a component of system 400 may be stored thereon as well as processing operations/instructions executed by a component of system 400. Components of the system 400 may interface with an OS of a processing device perform processing operations related to creation and management of an exemplary contact as well as transmission of content between documents of an application or between different applications. One or more components of system 400 may be used in providing an exemplary processing for exemplary contact creation, processing of communications that involve an exemplary contact and creation and/or modification of documents. Furthermore, it is presented that Application services components of system 400 may interface with other application services. Application services may be any resource that may extend functionality of one or more components of system 400. Application services may include but are not limited to: web search services, e-mail applications, calendars, device management services, address book services, informational services, etc.), line-ofbusiness (LOB) management services, customer relationship management (CRM) services, debugging services, accounting services, payroll services, and services and/or websites that are hosted or controlled by third parties, among other examples. Application services may further include other websites and/or applications hosted by third parties such as social media websites; photo sharing websites; video and music streaming websites; search engine websites; sports, news or entertainment websites, and the like. Application services may further provide analytics, data compilation and/or storage service, etc., in association with components of system 400.

Further, components of system 400 may possess processing means and may be configured to handle any type of input including but not limited to speech/voice input, text input, gesture input, handwritten input, among other examples. System 400 may be scalable and configurable to operate on a variety of processing devices including but not limited to: desktop computers, laptop computers, mobile processing devices such as phones, tablets, slates, wearable processing devices (e.g., watches, glasses, earpieces etc.), vehicular processing devices, and any other devices having at least one processor, among other examples. Exemplary system 400 comprises application components 406 including a user interface component 408, a contact management component 410, and a messaging service component 412, where each of the identified components may comprise one or more additional components.

System 400 may further comprise one or more storage(s) 414 that may store data associated with operation of one or more components of system 400. Storage(s) 414 are any physical or virtual memory space. In one example, storage(s) 414 may be a component of a processing device such as processing device examples described in the foregoing. In examples, storage(s) 414 may interface with other components of system 400. Data associated with any component of system 400 may be stored in storage(s) 414, where components may be connected to storage(s) 414 over a distributed network including cloud computing platforms and infrastructure services. Exemplary storage(s) 414 may be any of a first-party source, a second-party source, and a third-party source. Storage(s) 414 may store any data for processing operations performed by components of system 400, retained data from processing operations, stored programs, code or application programming interfaces (APIs), training data, links to resources internal and external to system 400 and knowledge data among other examples. Furthermore, in examples, components of system 400 may utilize knowledge data in processing by components of system 400. Knowledge may be used by one or more components of system 400 to improve processing of any of the application components 406 where knowledge data can be obtained from resources internal or external to system 400. In examples, knowledge data may be maintained in storage(s) 414 or retrieved from one or more resources external to system 400 by knowledge fetch operation. As an example, storage(s) 414 may store exemplary contacts/contact data, documents/files associated with an exemplary contact, communications corresponding to contacts, and connections between applications and/or third-party services, among other examples.

In FIG. 4, processing device 402 may be any device comprising at least one processor and at least one memory/storage. Examples of processing device 402 may include but are not limited to: processing devices such as desktop computers, servers, phones, tablets, phablets, slates, laptops, watches, and any other collection of electrical components such as devices having one or more processors or circuits. In one example processing device 402 may be a device of a user that is executing applications/services. In examples, processing device 402 may communicate with the application components 406 via a network 404. In one aspect, network 404 is a distributed computing network, such as the Internet. Application services may communicate with application components 406 via the network 404. Processing device 402 may be a device as described in the description of FIGS. 1-3. In some examples, processing device 402 may comprise multiple connected devices.

The application components 406 are a collection of components that are used to create and manage an exemplary contact and transmission of data associated with an exemplary contact. Application components 406 may comprise the user interface component 408, the contact management component 410, and the messaging service component 412. In alternative examples, one or more additional components may be created to manage operations described throughout the present disclosure. In different examples, the application components 406 may be used to execute independently from other application components 406. As an example, processing executed by any of the application components 406 may be performed by a processing device or incorporated into a product separately from processing performed by other components such as the user interface component 408 or the messaging service component 412. Application components 406 may be stored on one or more processing devices (e.g., client device) or access to one or more of the application components 406 may be distributed, for example through a distributed network.

The user interface component 408 is one or more components that are configured to enable interaction with a user of a processing device. Transparency and organization are brought to users of a processing device through the user interface component 408 where a user can interact with a plurality of applications to create and manage an exemplary contact. As an example, the user interface component 408 may comprise generation and display of one or more user interface elements that may be displayed upon a processing device during execution of one or more applications. The user interface elements may be graphical icons used to represent information associated with an application. The user interface component 408 may further execute as a front-end for display (e.g., graphical user interface) of back-end processing performed by the other application components 406. In examples, user interface definition files may be used to define user interface elements for fostering interaction between a processing device and applications/services that may be associated with an exemplary contact. User interface definition files may comprise programming instructions or operations for management and display of user interface elements associated with user interface component 408. As an example, user interface elements may be used to illustrate operations including but not limited to: creating an exemplary contact, modifying/managing an exemplary contact, selecting content to include in transfer to another application file/document, searching of contacts, accessing application/services and/or other resources, etc.

The contact management component 410 is a component of the system 400 that may be used to create and manage an exemplary contact. The contact management component 410 may be one or more executable programs, application programming interfaces (APIs), or any other collection of processing operations, functions, routines, protocols, and/or tools for building and executing software applications on one or more processing devices. As identified above, an exemplary contact as described herein may comprise identity data. Identity data is data that can be added to a communication for the transmission of information across one or more applications. Identity data may include but is not limited to: a contact identifier/name, phone number, an email address, informational association with applications/ services, sharing properties, and associated documents, among other examples. The contact management component 410 may further execute processing operations to associate an exemplary contact with one or more documents or files or other types of content. An exemplary identity data for a contact may be contact data. Contact data is any data that is associated with an exemplary contact and that may be used to identify transfer content from one application to another. For instance, an example of contact data may be a phone number or email address. However, in many examples, different forms of identity data are associated with an exemplary contact. For instance, contact data may be used to transmit data between applications/services, where other identity data such as a contact identifier/name may be used as an identifier for a user to easily locate the exemplary contact, for example, in a list of contacts.

The contact management component 410 may interface with other application components such as the user interface component 408 and the messaging service component 412 to create an exemplary contact. In examples, the user interface component 408 may provide user interface elements, that when selected, may trigger a processing device to initiate creation of an exemplary contact. In examples, processing operations (e.g., through APIs, macros, extensions/add-ons, etc.) may be executed to enable an exemplary contact to be created through one or more different applications. Processing operations may trigger a processing device to display user interface elements enabling completion of relevant fields for creation of an exemplary contact. Processing operations related to creation of an exemplary contact are described in the description of FIGS. 5 and 6. Examples of a created contact that is stored for use are illustrated in at least FIGS. 8, 9A and 9B. The contact management component 410 may execute processing operations related to the creation and storage of a contact. As an example, an exemplary contact may comprise contact data that may be used to transfer a communication from a first application and/or processing device to another application and/or processing device. A communication may be a transmission of electronic data in any form or format including but not limited to: messages, signals, waves, packets, data streams, etc. In other examples, the contact data may be used to transmit data between documents of the same application. In further examples, an exemplary contact may be configured to enable two-way communication between different applications. For instance, content may be transmitted from the first application to the second application. Updates to the content within a document of the second application may occur and the updates may be transmitted back to a communication occurring in the first application.

In creating a contact, the content management component 410 may interface with the messaging service component 412 to obtain and/or register an identifier for the transfer of data. The messaging service component 412 may be a first-party service, second-party service or third-party service that is used to assign contact data to an exemplary contact. For example, a phone number, email address, etc., may be assigned to an exemplary contact enabling the content management component 410 to transmit a communication associated with a contact to another application and/or device. As an example, a communication may be transmitted over a network 404 such as the internet. The messaging service component 412 may be one or more executable programs, application programming interfaces (APIs), or any other collection of processing operations, functions, routines, protocols, and/or tools for building and executing software applications on one or more processing devices. In one example, the messaging service component 412 may interface with the contact management component 410 to programmatically make and receive phone calls and/or send and receive text messages using web service APIs. For instance the content management component 410 may interface with a third-party messaging service that can be configured to assign contact data to an exemplary contact. The content management component 410 may be configured to manage utilization of a created contact to take contact from a first application and transfer the content to a document in a second application. However, alternative examples may transfer content from one document to another document within the same application. While examples may include transmission of content from a first application (e.g. chat, email, messaging application, etc.) to a document in a second application (e.g., word processing application, spreadsheet application, presentation document application, collaborative application, etc.), an association between a contact and a document does not restrict transfer of data to requiring multiple applications.

Figure 9A:
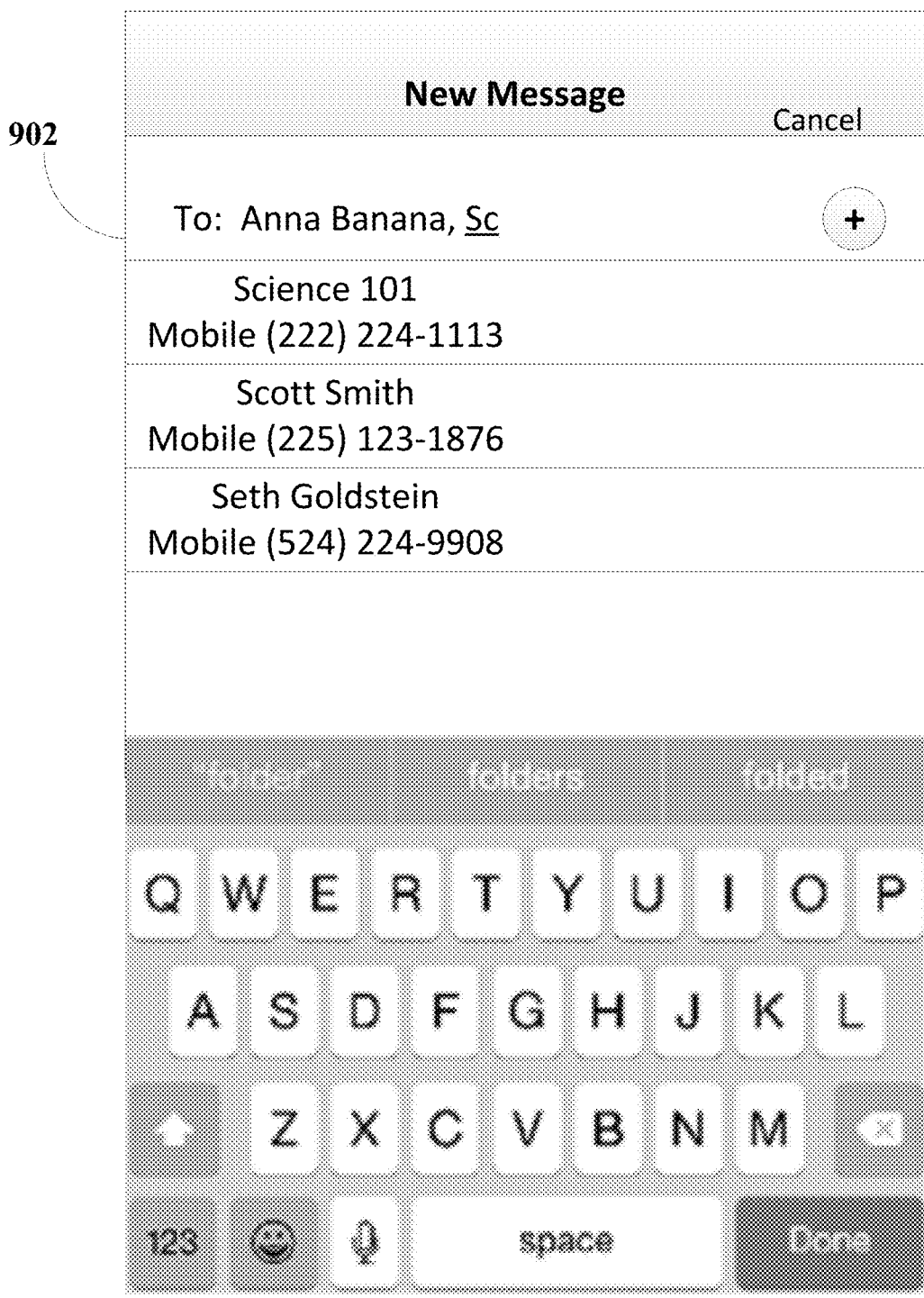
FIGS. 9A and 9B are exemplary processing device views illustrating application communication that comprises an exemplary contact with which aspects of the present disclosure may be practiced.
Figure 9B:
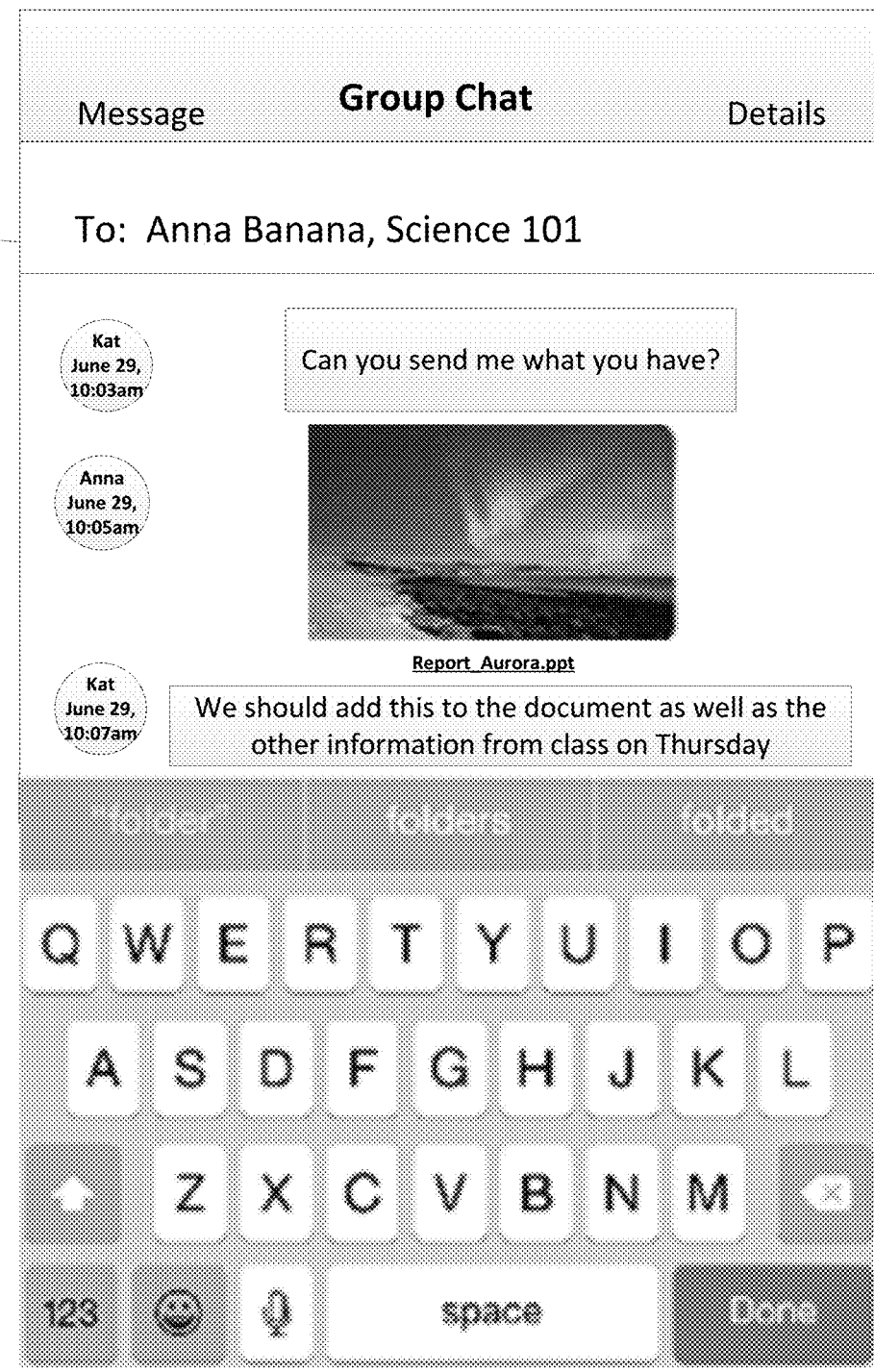

Furthermore, the content management component 410 may be configured to receive and process communications received over the network 404. In examples, a communication may be initiated through an application executing on a processing device such as processing device 402. Exemplary processing operations related to receiving and processing a communication are described in the description of FIGS. 7 and 9A-10B, among other examples. The content management component 410 may receive a communication associated with an exemplary contact. Refer to FIGS. 9A and 9B and the accompanying description for another example of a communication. The communication may comprise content from an application as well as contact data associated with the contact. In one instance, the communication may be received from processing device 402 executing one or more applications. In other examples, the communication may be received from other processing devices collaboratively executing an application. As long as the contact is included in a communication occurring in an application, the communication may be transmitted to one or more processing devices associated with the contact management component 410 for further processing.

In alternative examples, a communication may be propagated from an application to a messaging service of the messaging service component 412. As an example, the messaging service component 412 may assign contact data to an exemplary contact, receive communications associated with the assigned contact data, and forward the communication to the contact management component 410. In other instances, the messaging service component 412 may be used to assign contact data to a contact as well as manage update to the contact data without being involved in the transmission of communications. For instance, communication transmission and processing may be handled by processing operations performed by the contact management component 410, where the contact management component 410 may interface with a plurality of applications to enable the capture of content within an application and the transmission of a communication including the contact data to the content management component 410 for further processing. In one example, the contact management component 410 may interface with the messaging service component 412 to modify or update contact data for an exemplary contact. For instance, a phone number assigned to a contact may be changed.

The contact management component 410 may receive a communication and identify a document associated with an exemplary contact. One or more contacts may be associated with a document. In some examples, more than one document may be associated with an exemplary contact or contacts. Processing operations may be performed to identify a document that corresponds with an exemplary contact. The contact management component 410 may further execute processing operations to evaluate a communication for portions of content to include within a document. In some examples, all portions of content within a communication may be included within a document. Operations may be performed for parsing a communication to identify one or more portions of content from the communication that may be included within a document. In an example, operations may be performed to evaluate a relevance of a portion of content for inclusion within a document. For instance, a communication may include multiple portions of content that may be included. Consider an example where a document is directed to compiling content for a school project such as an astronomical presentation for a science class. Users may be collaborating in chat applications to coordinate content to include in the presentation and/or times to meet-up and discuss the presentation. In a communication thread, other topics may be discussed that does not relate to the presentation. For example, a user may mention to another user that a portion of content should be included in the presentation and then carry out an unrelated communication exchange discussing a favorite television show or movie with other users. In such an example, processing operations may be performed to evaluate a stream of data provided from the communication, where the operations may identify to include the portion of content relevant to the presentation and exclude the discussion of the television show/movie. In doing so, the processing operations execute by the contact management component 410 may evaluate data from the communication and the document including but not limited to: attribute data and metadata, content included within the document, keywords, user identification associated with a portion of content, type of content, and designation of content by user (e.g., a user may mark application content for inclusion within a document), among other examples.

The contact management component 410 may identify whether to include any of the portions of content within a document. In a case where one or more portions of content are determined to be included within the document, the contact management component 410 may format the content for insertion into a document. Processing operations may be executed for formatting of a portion of content within a document. In some examples, a data format of the content may be changed.

Processing operations may further be performed to create a new document and/or modify an existing document to include at least one portion of content from a communication. In one example, modification of an existing document may comprise inserting a portion of content in a specific location of a document. For instance, content within the document may be evaluated with content included in a communication in order to determine a relevant point to insert content in a document. As an example, consider a document being prepared for an astronomical presentation, where a conversation between users about Auroras may be included between content in a document discussing different types of auroras. In such an instance, the inclusion of the content may act as a placeholder to remind a user to update the document. In other examples, a document may be modified by including portions of content at a beginning (e.g., indicating recently added content) or at a point after other existing content within a document. One skilled in the art should recognize that programming developers are able to vary the insertion of content within the document.

The contact management component 410 and the messaging service component 412 may further interface to enable two-way communication of content between documents and/or applications. In an example where content is transmitted from a first application to a document in a second application, application components 406 may be configured to enable updates to content within the document (of the second application) to be transmitted back to a first application. For instance, a question may be posed in a first application, where the question can be added to a document in a second application. A collaborative user may locate and find an answer and update the document. An exemplary contact may be utilized to enable the answer to the question to be transmitted back to the first application.

Figure 5:
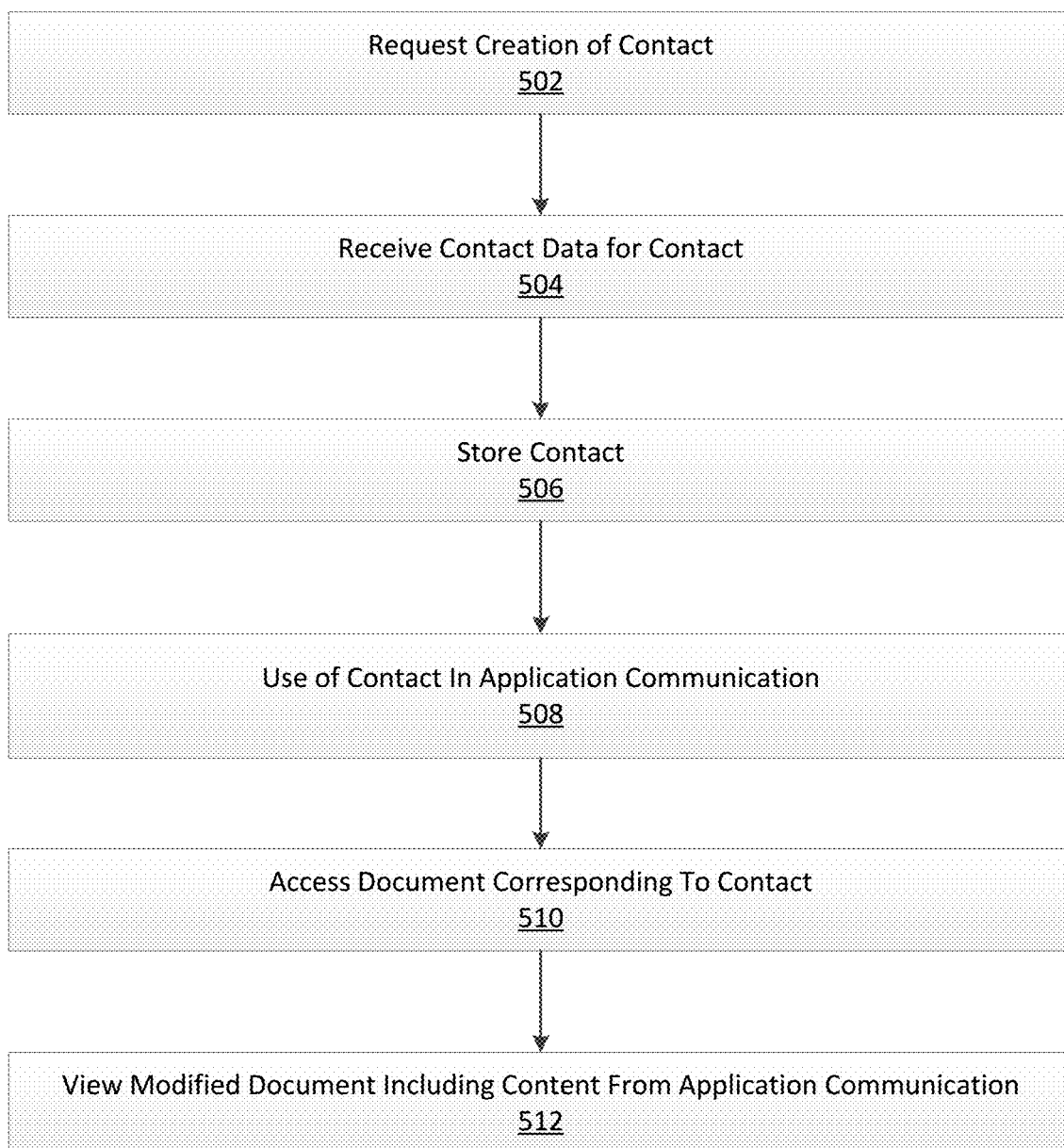
FIG. 5 is an exemplary method for management of an exemplary contact with which aspects of the present disclosure may be practiced.

FIG. 5 is an exemplary method 500 for management of an exemplary contact with which aspects of the present disclosure may be practiced. As an example, method 500 may be executed by an exemplary processing device and/or system such as those shown in FIGS. 1-4. In one example, system 400 of FIG. 4 describes examples of components that may be used for implementation of method 500. In examples, method 500 may execute on a device comprising at least one processor configured to store and execute operations, programs or instructions. For instance, method 500 may be processing operations executed by a client device such as processing device 402 described in FIG. 4. However, method 500 is not limited to such examples. In at least one example, method 500 may be executed (e.g., computer-implemented operations) by one or more components of a distributed network, for instance, web service/distributed network service (e.g., cloud service). Operations performed in method 500 may correspond to operations executed by a system and/or service that execute computer programs, application programming interfaces (APIs), or machine-learning processing, among other examples.

Method 500 begins at operation 502 where a request for creation of a contact is submitted. As an example, a request may be initiated by a processing device such as processing device 402 described in FIG. 4, among other examples. For instance, a client device may be executing an application in which an exemplary contact may be created. In an example, a processing device may receive a selection of a user interface element within an application to initiate contact creation. Examples of an exemplary contact have been described previously including the description of FIG. 4.

Flow may proceed to operation 504, where contact data for an exemplary contact is received. In response to requesting (operation 502) creation of a contact, the request may be processed by a processing device. In one example, data associated with the contact creation may be transmitted from a processing device (e.g., processing device 402) to at least service that may assign contact data to an exemplary contact. Examples of contact data have been described previously, for example, in the description of FIG. 4. Assigned contact data may be received (operation 504) at a processing device that initiated the request for contact creation. In alternative examples, a processing device that requests creation of an exemplary contact, may store contact data that may be assigned during creation of an exemplary contact. For instance, available contact data may be retrieved by an application/service associated with contact creation and stored for assignment to a contact when a processing device requests contact creation.

Flow may proceed to operation 506 where an exemplary contact is stored. An exemplary contact may be stored on a processing device such as processing device 402. However, storing (operation 506) of an exemplary contact may extend to processing devices associated with a distributed network. In one example, a contact may be stored (operation 506) locally on a processing device as well as stored on at least one processing device associated with an application/service that manages contacts and documents which are accessible through a network connection.

In some examples, flow may proceed to operation 508 where a created contact may be used in an application communication. Examples of a communication have been described previously including the description of system 400 of FIG. 4. As an example, an exemplary contact may be used in a communication (e.g., message, SMS message, email, chat/conversation, thread, call of a delimited within an application where the call to the delimiter signals capturing of content within the application, etc.). Use of an exemplary contact may trigger content within an application to be captured and included in a transmission to an application/service associated with managing of contacts/contact data. For instance, a communication may be transmitted from a client device to an application/service that executes processing operations executed by a contact management component 410 described in FIG. 4, for example. Content included within the communication may be incorporated into at least one document associated with the contact.

In examples, a processing device may access (operation 510) a document corresponding with an exemplary contact. For instance, a processing device such as processing device 402 of system 400 may launch a document associated with a contact. In one example, the document may be stored in a storage (e.g., storage 414) associated with an application/service that is accessible through a distributed network.

Flow may proceed to operation 512 where a modified document may be displayed on a processing device. In examples, the modified document may include contact from an application communication. For instance, an application communication may occur in a first application and content from the application communication may be incorporated within an exemplary document in another application. In alternative examples, content from an application communication may be incorporated into a document of the same application. In examples, a document may be further modified through operations received at a processing device such as processing device 402 described in FIG. 4. Updates to a document may be saved and/or transmitted for storage over a distributed network. In some examples, updates to content within the document may be transmitted to another document and/or application/service. For instance, a portion of a document (in a second application) may be updated and the updates may be transmitted back to a first application.

Figure 6:
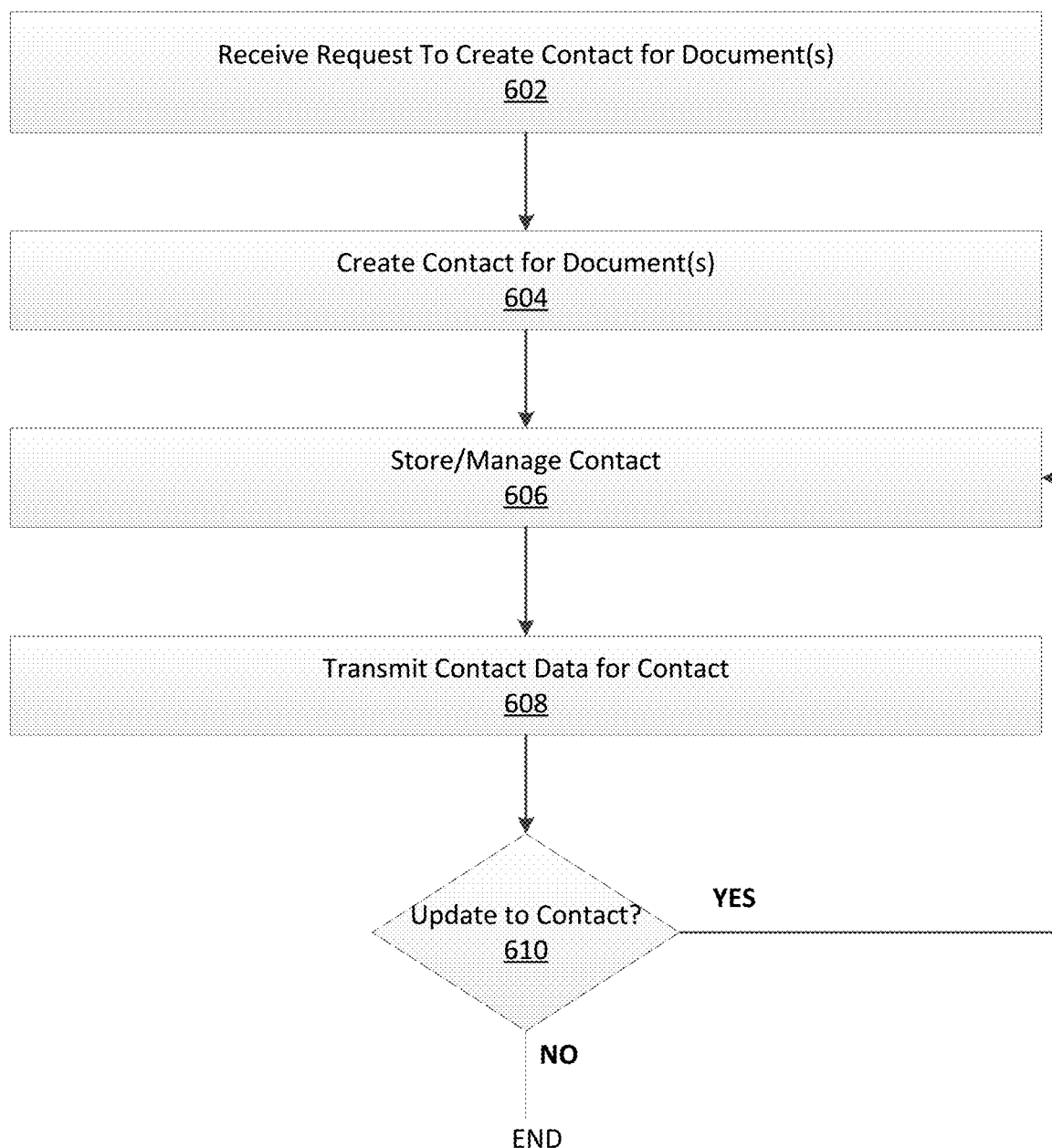
FIG. 6 is an exemplary method for creation of an exemplary contact with which aspects of the present disclosure may be practiced.

FIG. 6 is an exemplary method 600 for creation of an exemplary contact with which aspects of the present disclosure may be practiced. As an example, method 600 may be executed by an exemplary processing device and/or system such as those shown in FIGS. 1-4. In one example, system 400 of FIG. 4 describes examples of components that may be used for implementation of method 600. In examples, method 600 may execute on a device comprising at least one processor configured to store and execute operations, programs or instructions. However, method 600 is not limited to such examples. In at least one example, method 600 may be executed (e.g., computer-implemented operations) by one or more components of a distributed network, for instance, web service/distributed network service (e.g., cloud service). In examples, operations performed in method 600 may correspond to operations executed by a system and/or service that execute computer programs, application programming interfaces (APIs), or machine-learning processing, among other examples.

Method 600 begins at operation 602 where a request to create an exemplary contact is received. An exemplary contact may be associated with one or more documents. As an example, a request may be received from a processing device such as processing device 402 described in the description of FIG. 4. The request may be received (operation 602) by an application/service (comprising one or more processing devices) that manages exemplary contacts.

Flow may proceed to operation 604, where an exemplary contact may be created for one or more documents. Creation (operation 604) of an exemplary contact may comprise storing (operation 606) the contact (and associated contact data) on at storage associated with an application/service for contact management. In examples, a communication may be received that is associated with the created contact where the exemplary contact may be used to identify a document and include content within the document. In one example, the creating (operation 604) may comprise interfacing with a communication service (e.g. messaging service component 412 described in FIG. 4) to obtain the contact data to assign to the contact, wherein the contact data is at least one selected from a group consisting of: a phone number, and an email address.

Flow may proceed to operation 608 where contact data for the contact may be transmitted to one or more processing devices. In one example, contact data for the contact may be transmitted to a processing device such as processing device 402, which may store and utilize exemplary contact/contact data. In other examples, contact data may be transmitted to other applications/services that may be associated with assignment of contact data (e.g., phone number or email address).

In some examples method 600 may proceed to decision operation 610 where it is determined whether an update to contact data has occurred. If an update (e.g., name change, contact data change, deletion, etc.) to an exemplary contact is received, flow branches YES and returns back to operation 606 where a stored contact is updated. If no update is received for an exemplary contact, flow branches NO and processing ends or remains idle until further processing associated with an exemplary contact is initiated.

Figure 7:
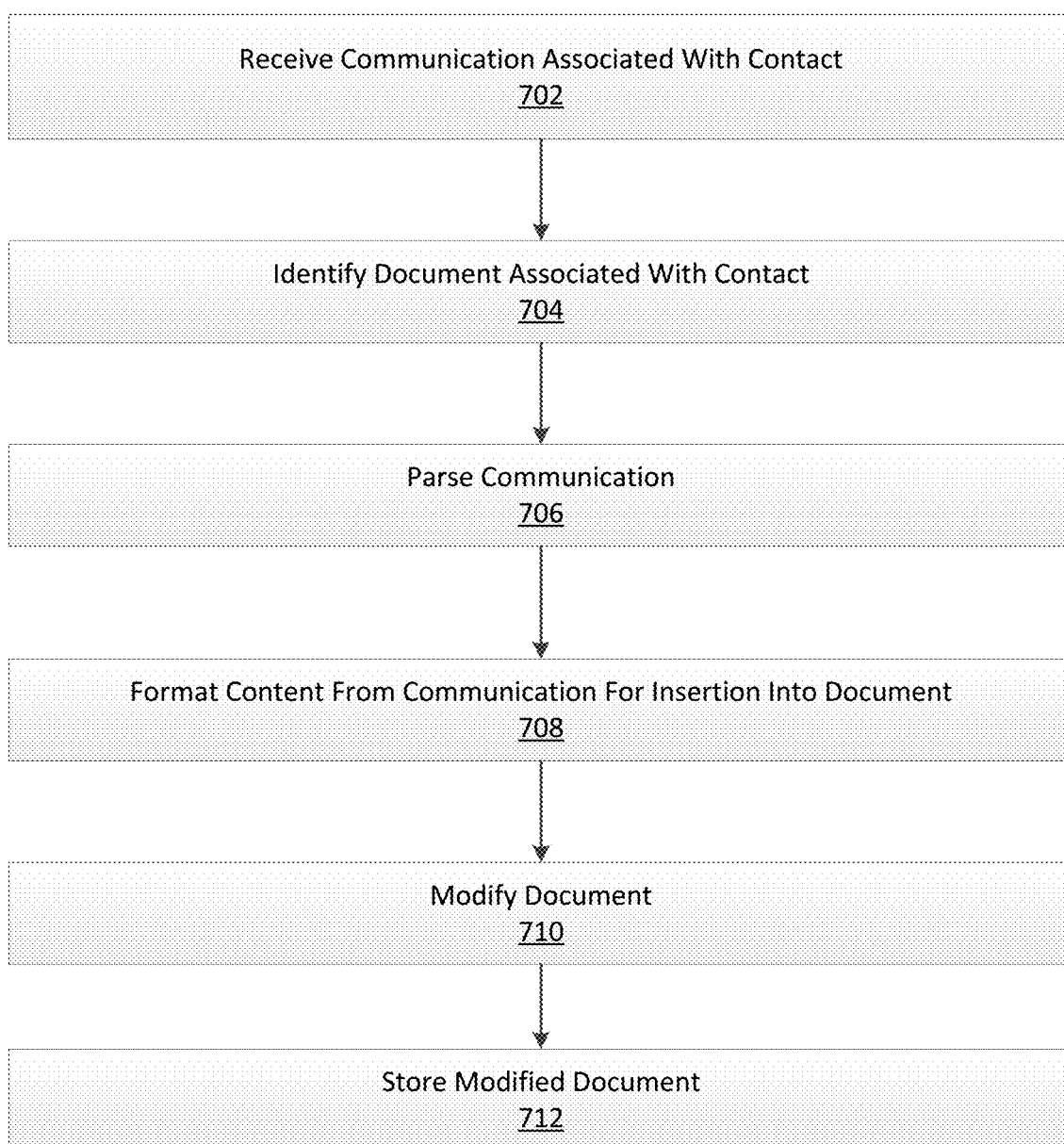
FIG. 7 is an exemplary method for communication processing with which aspects of the present disclosure may be practiced.

FIG. 7 is an exemplary method 700 for communication processing with which aspects of the present disclosure may be practiced. As an example, method 700 may be executed by an exemplary processing device and/or system such as those shown in FIGS. 1-4. In one example, system 400 of FIG. 4 describes examples of components that may be used for implementation of method 700. In examples, method 700 may be executed on a device comprising at least one processor configured to store and execute operations, programs or instructions. However, method 700 is not limited to such examples. In at least one example, method 700 may be executed (e.g., computer-implemented operations) by one or more components of a distributed network, for instance, web service/distributed network service (e.g., cloud service). In examples, operations performed in method 700 may correspond to operations executed by a system and/or service that execute computer programs, application programming interfaces (APIs), or machine-learning processing, among other examples.

Method 700 begins at operation 702 where a communication associated with a contact is received. As an example, the communication may be received (operation 702) at a processing device associated with an application/service that manages contacts/contact data.

Flow may proceed to operation 704, where a document associated with the contact is determined from the received communication. As an example, the communication may specify data (e.g., metadata) that identifies the contact and/or contact data. Such information may be used to lookup a document associated with an exemplary contact.

Flow may proceed to operation 706 where a received communication is parsed to determine portions of content from the communication to include within a document corresponding to an exemplary contact. In examples, portions of content that may be included within a communication comprise but are not limited to: a conversation, a message, an email, a file, a link, video data, image data, handwritten input and audio content, among other examples. Processing operations associated with parsing (operation 706) are described in the description of the contact management component 410 of system 400. In response to determining that one or more portions of a communication are to be included within a document, flow may proceed to operation 708 where content from the communication is formatted for insertion into a document. Examples of formatting are described in the description of the contact management component 410 of system 400 and may include but are not limited to: changing a data format of content, aligning content for insertion in document, modifying content (including typographical correction), verification of linked data, adding emphasis, adding comment data, etc.

At operation 710, processing operations may be executed to modify a document associated with a contact. In one example, the document may be modified to include one or more portions of content from a communication. For instance, formatted content may be included within a document. In some examples, processing operations executed may determine a specific insertion point to insert content within a document. Flow may proceed to operation 712 where a modified document is stored. In one example, the modified document may be stored on a storage of an application/service that is accessible through a distributed network. In some examples, a stored document may be transmitted from such an application/service to one or more processing devices.

Figure 8:
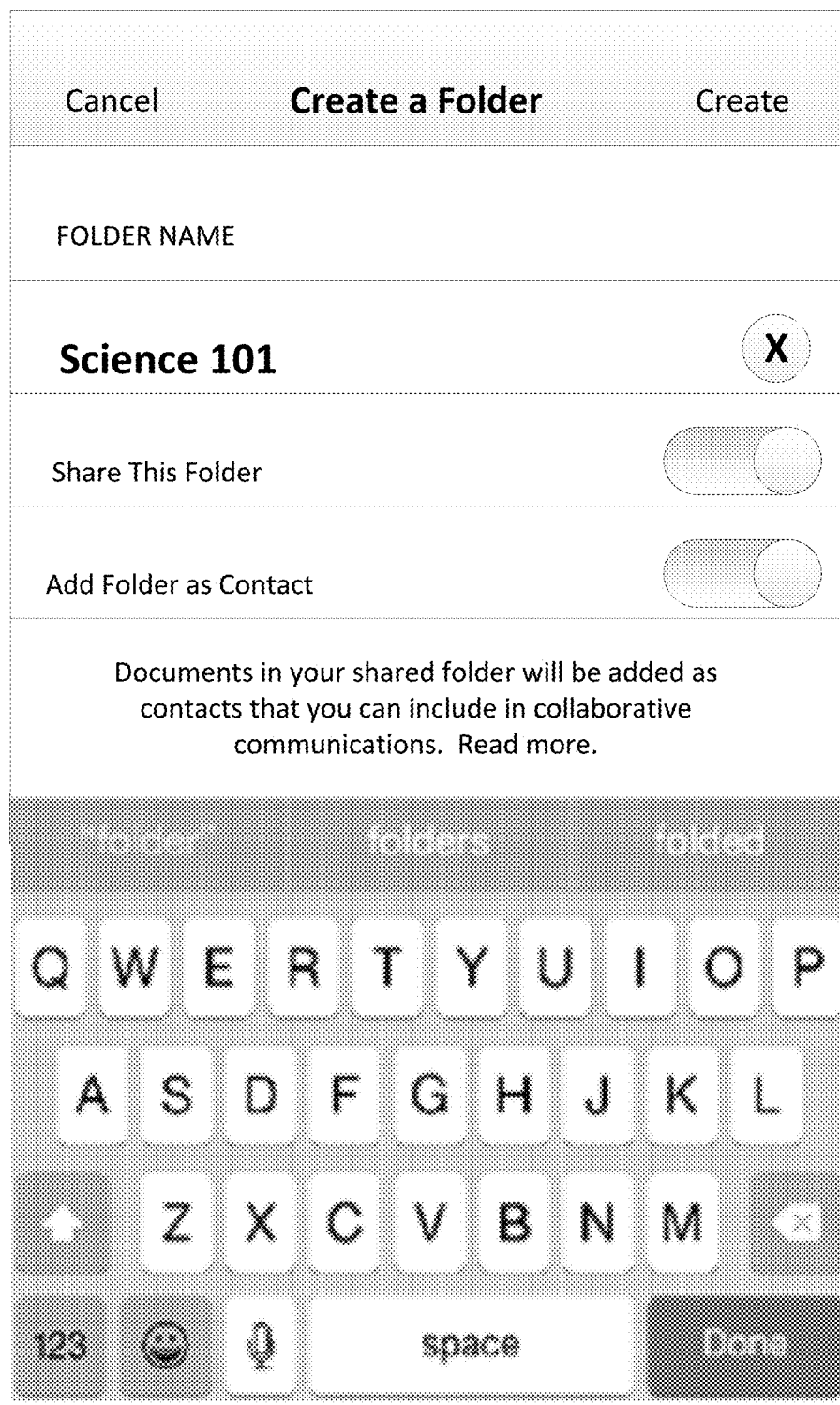
FIG. 8 is an exemplary processing device view illustrating creation of an exemplary contact with which aspects of the present disclosure may be practiced.

FIG. 8 is an exemplary processing device view 800 illustrating creation of an exemplary contact with which aspects of the present disclosure may be practiced. Processing device view 800 is an example of a processing device view for a processing device during creation of an exemplary contact. In one example, processing device view 800 may be a processing device view from a client device such as processing device 402 as described in FIG. 4. As an example, processing device view 800 illustrates data fields that may be included for contact creation. In the example shown in processing device view 800, a contact of "Science 101" is being created. For instance, a processing device may be used to create a folder for Science 101 that can be assigned as a contact. Creation of a contact may present user interface elements that enable a user, through a processing device, to create and manage an exemplary contact. For example, the contact data may be shared to associate contact data with one or more documents managed over a distributed application/service. The folder of Science 101 maybe added as contact, for example where Science 101 may appear in a list of contacts associated with a user account and/or processing device. Science 101 may then be usable like any other contact information to include within a communication. In examples, a created contact may be associated with an application/service that manages documents over a distributed network. For instance, documents in a shared folder (of a distributed application/service) may be added as contacts that may be included in collaborative communications. When a created contact is utilized in a communication (e.g., collaborative communication in an application), content from a communication may captured and transmitted to a document associated with the contact (e.g., Science 101).

FIGS. 9A and 9B are exemplary processing device views, 900 and 910 respectively, illustrating application communication that comprises an exemplary contact with which aspects of the present disclosure may be practiced. Processing device view 900 (FIG. 9A) illustrates use of an exemplary contact of Science 101 within a communication. For example, an SMS message (902) may be initiated where a user is attempting to include a contact of Science 101 in "To" field the SMS message 902. As shown in processing device view 900, a processing device may recognize input received and provide auto-complete suggestions for the including of a contact within the "To" field of the SMS message 902. When an input of "Sc" is received by a processing device, a processing device may process the received input and return results from a contact list as shown in processing device view 900. Processing device view 910 (FIG. 9B) illustrates inclusion of a contact of Science 101 within a communication. A communication thread 912 is shown in processing device view 910 where inclusion of an exemplary contact (e.g., Science 101) triggers capturing of content from the communication thread 912, where content may be captured and included in a document associated with an exemplary contact. As shown in processing device view 910, content from a presentation (e.g., Report Auora.ppt) is included within the communication thread 912. Further communications are included in the communication thread 912, for example, where a user indicates that such presentation content should be included within a document that users are compiling for a class presentation. Content from the communication thread 912 may be transmitted for processing to determine portions of content to include within a document associated with a contact of Science 101, for example.

Figure 10A:

FIGS. 10A and 10B are exemplary processing device views, 1000 and 1010 respectively, illustrating modification of a document that corresponds to an exemplary contact with which aspects of the present disclosure may be practiced. Building off the examples described in FIGS. 9A and 9B, processing device view 1000 illustrates a processing device view where a document 1002 is displayed. As an example, a document 1002 (e.g., Aurora Document) is a collaborative or shared document. In one instance, document 1002 may be a document maintained by a distributed application/service (e.g. file hosting service). A file hosting service may be any of a first-party application service and a third-party application service. As shown in processing device view 1000, content from an SMS message (e.g., presentation Report Auora.ppt) is included within document 1002. Processing device view 1010 is a processing device view illustrating further presentation of content from document 1002 (e.g., Aurora Document). As shown in processing device view 1010, conversation content 1012 is included within document 1002. Processing device view 1010 illustrates inclusion of conversation content 1012 at specific position in document 1002. For instance, context of the conversation content 1012 may be evaluated where it is determined that the conversation content 1012 is associated with portions of the document 1002 related to the description of Auroras, for example.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method, comprising:
   receiving an indication by a user associated with a direct conversation among a plurality of users that content is to be included in a document;
   receiving a contact, wherein the contact is associated with the document, and the contact is a non-user;
   using the contact to passively capture the content and transfer the content to the document; and
   causing a display of the content in the document.

2. The method of claim 1, further comprising causing a display of the content in the conversation.

3. The method of claim 1, further comprising inserting, prior to causing the display of the content, the content into the document.

4. A method, comprising:
   receiving an indication by a user in a direct conversation among a plurality of users that content identified in the conversation is relevant to a document;
   using a contact associated with the conversation and with the document as a non-user to passively capture content from the conversation;
   based on receiving the indication, causing the content to be included in the document; and
   receiving an update to the document and
   upon receiving the update to the document, transmitting the update to the conversation to cause the update to be presented in the conversation.

5. The method of claim 4, wherein the conversation is of a first application and the document is of a second application.

6. The method of claim 5, further comprising:
   prior to causing the content to be included in the document, accessing the document; and
   determining a location in the document where the content is to be included.

7. The method of claim 6, further comprising formatting, prior to causing the content to be included in the document, the content based on the location in the second application.

8. The method of claim 4, wherein:
   the indication by the user in the conversation comprises a reference to the content in the conversation; and
   the method further comprises receiving the content associated with the reference.

9. The method of claim 4, wherein:
   the content comprises an attachment in the conversation; and
   the indication by the user in the conversation comprises a reference to the attachment in the conversation.

10. The method of claim 4, further comprising prior to receiving the indication, associating the contact with the conversation and with the document.

11. A system, comprising:
    a processor; and
    a memory storing computer-executable instructions, that when executed by the processor, cause operations to be performed, the operations comprising:
    receiving an indication by a user in a direct conversation among a plurality of users in a first application that content identified in the conversation should be included in a document of a second application, wherein a contact associated with the conversation and with the document is used as a non-user to passively transfer content from the conversation to the document;
    based on receiving the indication, transferring a portion of the content to the second application to cause the portion of the content to be included in the document to update the document;
    receiving an update to the document; and
    upon receiving the update to the document, transmitting the update to the first application to cause the update to be presented in the conversation.

12. The system of claim 11, wherein the memory stores further computer-executable instructions for parsing, prior to transferring the portion of the content to the second application, the content to determine the portion of the content to include in the document.

13. The system of claim 12, wherein determination of the portion of the content to include in the document is based on relevance of the content to the document.

14. The system of claim 11, wherein the memory stores further computer-executable instructions for:
    prior to transferring the portion of the content to the second application, accessing the document; and
    determining a location in the document where the portion of the content is to be included in the document.

15. The system of claim 11, wherein the memory stores further computer-executable instructions for formatting, prior to transferring the portion of the content to the second application, the portion of the content for insertion into the document based on the second application.

16. The system of claim 11, wherein:
    the indication by the user in the conversation comprises a reference to the content in the conversation; and
    the memory stores further computer-executable instructions for receiving the content associated with the reference.

17. The system of claim 11, wherein:
    the content comprises an attachment in the conversation; and
    the indication by the user in the conversation comprises a reference to the attachment in the conversation.

18. The system of claim 11, wherein the memory stores further computer-executable instructions for associating, prior to receiving the indication, the contact with the conversation and with the document.

19. The system of claim 11, wherein the memory stores further computer-executable instructions for receiving a request to create the contact.

20. The system of claim 19, wherein the memory stores further computer-executable instructions for creating the contact in response to receiving the request to create the contact, the creating comprising interfacing with a communication service to obtain contact data to assign to the contact, the contact data comprising at least one of a phone number or an email address.

* * * * *